United States Patent [19]

Iwashita

[11] Patent Number: 5,015,935
[45] Date of Patent: May 14, 1991

[54] SERVO-CONTROL APPARATUS

[75] Inventor: Yasusuke Iwashita, Yamanashi, Japan

[73] Assignee: Fanuc Ltd., Minamitsuru, Japan

[21] Appl. No.: 490,564

[22] PCT Filed: Sep. 25, 1989

[86] PCT No.: PCT/JP89/00969
§ 371 Date: May 21, 1990
§ 102(e) Date: May 21, 1990

[87] PCT Pub. No.: WO90/03603
PCT Pub. Date: Apr. 5, 1990

[30] Foreign Application Priority Data

Sep. 30, 1988 [JP] Japan ................... 63-243990

[51] Int. Cl.$^5$ .................... G05B 11/01
[52] U.S. Cl. .................... 318/630; 318/632
[58] Field of Search .................... 318/630, 632

[56] References Cited

U.S. PATENT DOCUMENTS 4,710,689 12/1987 Uetsuki et al. ............... 318/630
4,743,823 5/1988 Fujita ........................... 318/630
4,868,475 9/1989 Rozozinski et al. ........... 318/632

Primary Examiner—William M. Shoop, Jr.
Assistant Examiner—Saul M. Bergmann
Attorney, Agent, or Firm—Staas & Halsey

[57] ABSTRACT

A servo-control apparatus generates a velocity command by applying backlash correction data to position error data when direction of rotation of a servomotor is reversed, and performs a backlash correction by adding an amount of backlash acceleration to the velocity command. In order to terminate backlash acceleration at an appropriate time, velocity feedback pulses are accumulated by a counter from the moment acceleration control starts, and the accumulated value of velocity feedback is monitored by an acceleration-stop instructing unit. When the accumulated value attains a predetermined value, an acceleration output unit is caused to halt the output of the amount of backlash acceleration to complete control of backlash acceleration.

4 Claims, 2 Drawing Sheets

SERVO-CONTROL APPARATUS

BACKGROUND OF THE INVENTION

1. Technical Field

This invention relates to a servo-control apparatus and, more particularly, to a servo-control apparatus capable of performing a backlash correction rapidly and of reducing quadrant projections produced as a result of friction and backlash.

2. Background Art

In order to correct for backlash of gears, or the like, when the direction of rotation of a servomotor controlling the feed shaft of a machine tool is reversed, or in other words, when the direction of travel of the movable element of the machine is reversed, preset backlash correction data is applied to position error data to generate a velocity command, and the rotation of the servomotor is controlled based on the velocity command. However, since the backlash correction data acts upon a velocity loop through a predetermined position gain $K_P$, the machine does not move immediately because of a delay in the servo-system. As a consequence, a quadrant projection is produced at the location where the direction of machining is reversed.

Accordingly, in order to diminish the effects of backlash and friction and reduce projections at quadrant changeover points at the time of cutting, it has been proposed to apply a suitable amount of acceleration (referred to as "backlash acceleration") to the velocity command for a prescribed period of time. However, when an NC unit effects backlash correction at the same time that the backlash correction data is delivered to the servo side, the motor is not completely reversed in direction owing to the delay between the command and the servo-system. The unfortunate result is that bite-in is caused on the inner side. In actuality, therefore, the direction in which the motor rotates is monitored and backlash acceleration is applied at the timing of the reversal in direction of rotation. When control of backlash acceleration is carried out at the time of the reversal in motor direction, the occurrence of quadrant projections caused by backlash and friction in the machine system can be reduced considerably.

There are cases where the effect of a sudden change in velocity at the end of acceleration shows up at the cut surface in the form of inadequate smoothness if the amount of backlash acceleration is made constant over the entire period of application. Accordingly, it has been proposed to enlarge the amount of backlash acceleration at the start of acceleration in order to prevent inadequate acceleration, and thereafter reduce the amount of acceleration gradually with the passage of time to prevent a sudden change in velocity when backlash acceleration ends.

However, the backlash acceleration algorithm itself is open-loop control, and it is required that parameters (the amount of backlash acceleration, backlash acceleration time, etc.) be set accurately for each and every machine.

In addition, optimum parameters change depending upon cutting velocity, workpiece weight, temperature, the condition of the cut surface, etc. Consequently, even if quadrant projections can be made very small under certain conditions, these projections can enlarge or cut-in can result on the inner side when cutting is performed under other conditions.

SUMMARY OF THE INVENTION

Accordingly, an object of the present invention is to provide a servo-control apparatus capable of eliminating backlash with the same parameters even if machine conditions and cutting conditions change, thereby making it possible to eliminate quadrant projections.

Another object of the present invention is to provide a servo-control apparatus capable of ending backlash acceleration at an optimum timing, whereby the amount of backlash acceleration can be made a suitable value and quadrant projections can be eliminated.

Yet another objective of the present invention is to provide a method for generating a velocity command by applying backlash correction data to position error data when direction of rotation of a servomotor is reversed, and performing a backlash correction by adding an amount of backlash acceleration to said velocity command.

In accordance with the present invention, the foregoing objects are attained by monitoring the accumulated value of velocity feedback and stopping backlash acceleration when the accumulated value becomes equal to a predetermined value.

DESCRIPTION OF THE PREFERRED EMBODIMENTS

Figure 1:
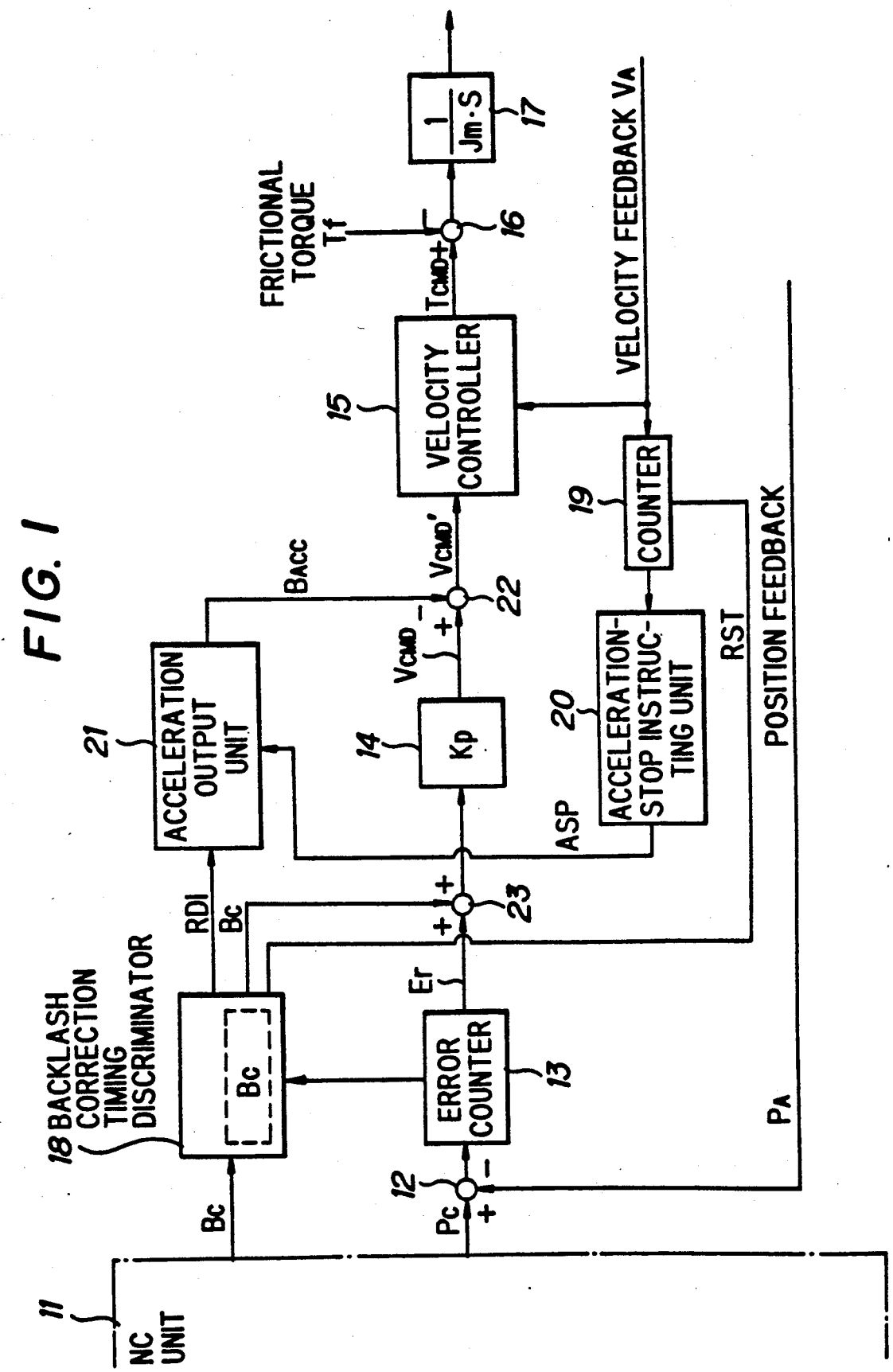
FIG. 1 is a block diagram of a servo-control apparatus according to the present invention.

FIG. 1 is a block diagram of a servo-control apparatus according to the present invention. Numeral 11 denotes an NC unit which generates a move command $P_C$ every predetermined sampling time $T_S$, and which outputs an amount of backlash correction $B_C$ when there is a reversal in the direction of the move command. Numeral 12 denotes a position error arithmetic unit for computing a difference between the move command $P_C$ and a detected amount of movement $P_A$ every sampling time. Numeral 13 designates an error counter for accumulating the difference in accordance with the equation $$E_r + (P_C - P_A) \rightarrow E_r$$

and outputting a position error $E_r$. Numeral 15 denotes a velocity controller for outputting a torque command based on the difference between a velocity command $V_{CMD}'$ and velocity feedback (actual velocity) $V_A$. Numeral 16 represents an arithmetic unit for computing a frictional torque $T_f$ from a torque command $T_{CMD}$ outputted by the velocity controller 15. Shown at numeral 17 is a machine system including a servomotor, which is the object controlled, a pulse coder, etc. The machine system 17 is expressed by a transfer function ($J_m$ represents motor inertia).

Numeral 18 denotes a backlash correction timing discriminator, and 19 a counter to which pulses generated by a pulse coder (not shown) are applied as the velocity feedback $V_A$ in order to be counted during each sampling time period $T_S$. Numeral 20 denotes an acceleration-stop instructing unit for monitoring the accumulated value in the counter and outputting an acceleration-stop signal ASP when the accumulated value attains a predetermined value, e.g,. 2-3. Numeral 21 denotes a unit for outputting the amount of acceleration. An adder for adding the amount of backlash acceleration is shown at numeral 22.

The backlash correction timing discriminator 18 stores and holds the amount of backlash correction $B_C$ supplied by the NC unit 11 when the direction of the move command is reversed. In addition, the discriminator 18 monitors the content (position error) $E_r$ of the error counter 13 and detects the reversal in the direction of rotation of the servomotor in response to $E_r=0$. In response to detection of the reversal in direction of rotation, the discriminator 18 outputs the amount of backlash correction $B_C$ to an adder 23, outputs a signal RDI indicative of the reversal in rotational direction to the acceleration output unit 21, and outputs a counter reset signal RST.

The acceleration output unit 21 outputs an amount of backlash acceleration $B_{ACC}$ when the position error $E_r$ becomes zero (RDI="1"), and terminates the output of the backlash acceleration when the accumulated value of velocity backlash $V_A$ becomes equal to a predetermined value (ASP="1").

The overall operation of the apparatus of FIG. 1 will now be described.

The difference, which is calculated in the arithmetic unit 12, between the move command $P_C$ and the detected amount of movement $P_A$ every sampling time $T_S$ is integrated by the error counter 13 to obtain the position error $E_r$, after which the position error is multiplied by the position gain $K_P$ to provide the velocity command $V_{CMD}$. The velocity controller 15 subsequently outputs the torque command $T_{CMD}$ conforming to a velocity error, thereby rotating the servomotor.

When the direction of commanded movement is reversed under these conditions, the preset amount of backlash $B_C$ is outputted by the NC unit 11, and the latter generates a move command PC in the reversed direction every sampling time $T_S$.

The backlash correction timing discriminator 18 holds the abovementioned amount of backlash correction $B_C$ and subsequently monitors the content (position error) $E_r$ of the error counter 13 in parallel with the servo control processing described above. When the condition $E_r=0$ is established, it is determined that the servomotor has reversed direction.

In response to detection of the reversal in rotational direction, the discriminator 18 outputs the held backlash correction $B_C$ to the adder 23, outputs the rotational direction reversal signal RDI to the acceleration output unit 21 and outputs the counter reset signal RST to reset the content of counter 19 to zero.

The backlash correction adder 23 adds the backlash correction $B_C$ and the position error $E_r$ and applies the result to a position gain setting unit 14. The latter multiplies the result by the position gain $K_P$ to generate the velocity command $V_{CMD}$ conforming to the amount of backlash correction.

The acceleration output unit 21 outputs a constant amount of backlash acceleration $B_{ACC}$ in response to the rotational direction reversal signal RDI. As a result, the adder 22 adds the amount of backlash acceleration $B_{ACC}$ and the velocity command $V_{CMD}$ and applies the sum to the velocity controller 15 as the true velocity command $V_{CMD}'$.

The velocity controller 15 computes the velocity error and outputs the torque command $T_{CMD}$ conforming to this velocity error, thereby rotating the servomotor 17 to rapidly correct backlash.

In parallel with the foregoing processing, the counter 19 accumulates the velocity feedback $V_A$ from the moment acceleration control begins (i.e., from the moment $E_r=0$ is established). That is, the counter 19 receives, as the velocity feedback $V_A$, the pulses generated by a pulse coder (not shown) and counts these pulses during each sampling time period $T_S$ of digital servo-processing.

The acceleration-stop instructing unit 20 monitors the accumulated value in the counter 19 and outputs the acceleration-stop signal ASP when the accumulated value attains a predetermined value, e.g,. 2-3. This causes the acceleration output unit 21 to stop outputting the backlash acceleration signal $B_{ACC}$, thereby completing backlash acceleration control.

The reason for terminating backlash acceleration when the accumulated value reaches 2-3 is as follows:

In digital servo-control, the sampling time $T_S$ is on the order of 1 msec, and spatial resolution of the servomotor, which is dependent upon the resolution of the pulse coder, is on the order of 10,000/rev. Velocity is very low when the servomotor reverses direction (i.e., at the start of acceleration control). Consequently, the number of feedback pulses (velocity feedback) $V_A$ every sampling time is usually zero and sometimes attains a value of one. Therefore, when it is detected that the velocity feedback $V_A$ has attained a value of one and backlash acceleration is terminated, termination timing is too soon, a sufficient backlash acceleration cannot be applied and quadrant projections cannot be eliminated. Further, in an arrangement where backlash acceleration is terminated upon detecting that the condition $V_A=1$ has been established, the termination of backlash acceleration will occur if the condition $VA=1$ is established due to slight vibration in the motor for some reason (such as an external disturbance or unsteady current). As a result, the amount of acceleration will be greatly inadequate and backlash acceleration control will lose its meaning.

On the other hand, if backlash acceleration is terminated after the number of feedback pulses (velocity feedback) $V_A$ in the sampling time $T_S$ is detected to have attained a value of two, the rotational velocity at this time will be 12 rpm. As a result, the timing for terminating acceleration will be too late, backlash acceleration will be excessive and cut-in will occur on the inner side.

Accordingly, in the present invention, the arrangement is such that the accumulated value of the velocity feedback $V_A$ is monitored and backlash acceleration is terminated when the accumulated value becomes 2-3. With such an arrangement, timing for ending backlash acceleration can be made when the amount of backlash acceleration attains the optimum value without being hastened or retarded excessively and irrespective of some variation in load conditions, a variation in cutting velocity, etc.

Figure 2:
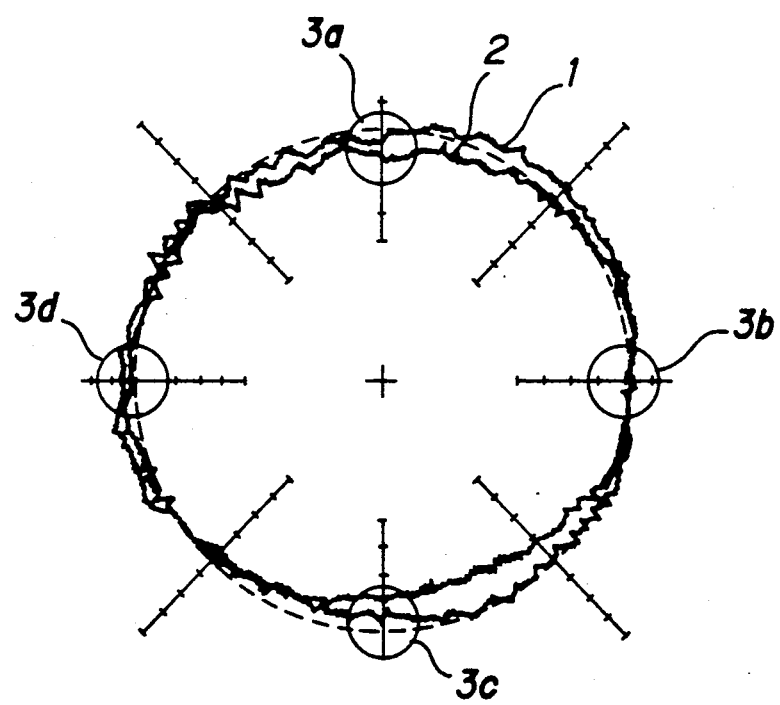
FIG. 2 shows the results of measurement in a case where a machine tool is made to cut a perfect circle using the servo-control apparatus according to the present invention.

FIG. 2 shows the results of measurement in a case where a machine tool is made to cut a perfect circle using the servo-control apparatus according to the present invention. The dashed line indicates a true circle, and numerals 1, 2 indicate the results of measurement for a case where cutting is performed in clockwise and counter-clockwise directions, respectively. Quadrant projections and cut-in on the inner side are eliminated at quadrant changeover points $3a$-$3d$.

Thus, with the present invention backlash acceleration when the direction of servomotor rotation is reversed and ends backlash acceleration when the accumulated value of velocity feedback becomes equal to a predetermined value of 2-3. As a result, timing for ending backlash acceleration can be made when the amount of acceleration attains the optimum value without being hastened or retarded excessively and irrespective of some variation in load conditions, a variation in cutting velocity, etc. This makes it possible to eliminate quadrant projections and cut-in on the inner side.

I claim:

1. A servo-control apparatus for generating a velocity command by applying backlash correction data to position error data when direction of rotation of a servomotor is reversed, and performing a backlash correction by adding an amount of backlash acceleration to said velocity command, comprising:

means for detecting reversal of the direction of rotation of the servomotor;

means for detecting that an accumulated value of velocity feedback has become equal to a predetermined value after backlash acceleration is started; and means for outputting the amount of backlash acceleration when direction of rotation of a servomotor is reversed, and terminating output of the amount of backlash acceleration when the accumulated value of velocity feedback becomes equal to the predetermined value.

2. A servo-control apparatus according to claim 1, wherein said predetermined value is two.

3. A servo-control apparatus according to claim 1, wherein said predetermined value is three.

4. A servo-control method for generating a velocity command by applying backlash correction data to position error data when direction of rotation of a servomotor is reversed, and performing a backlash correction by adding an amount of backlash acceleration to said velocity command, said method comprising the steps of:

detecting reversal of the direction of rotation of the servomotor;

detecting that an accumulated value of velocity feedback has become equal to a predetermined value after backlash acceleration is started;

outputting the amount of backlash acceleration when direction of rotation of a servomotor is reversed; and terminating output of the amount of backlash acceleration, when the accumulated value of velocity feedback becomes equal to the predetermined value.

* * * * *